(12) United States Patent
Yin et al.

(10) Patent No.: US 11,044,633 B2
(45) Date of Patent: Jun. 22, 2021

(54) ACCURATE LOAD SHEDDING SYSTEM AND METHOD BASED ON A POWER-DEDICATED WIRELESS NETWORK

(71) Applicants: STATE GRID JIANGSU ELECTRIC POWER CO., LTD, Jiangsu (CN); NARI TECHNOLOGY CO., LTD, Jiangsu (CN)

(72) Inventors: Jijun Yin, Jiangsu (CN); Qing Chen, Jiangsu (CN); Zheng Wu, Jiangsu (CN); Xiaofeng Wang, Jiangsu (CN); Xiao Lu, Jiangsu (CN); Jianyu Luo, Jiangsu (CN); Xueming Li, Jiangsu (CN); Kaiming Luo, Jiangsu (CN); Jianbo Luo, Jiangsu (CN); Yunsong Yan, Jiangsu (CN)

(73) Assignees: State Grid Jiangsu Electric Power Co., Ltd., Jiangsu (CN); Nari Technology Co., Ltd., Jiangsu (CN)

( * ) Notice: Subject to any disclaimer, the term of this patent is extended or adjusted under 35 U.S.C. 154(b) by 158 days.

(21) Appl. No.: 16/409,602

(22) Filed: May 10, 2019

(65) Prior Publication Data
US 2020/0252833 A1 Aug. 6, 2020

(30) Foreign Application Priority Data
Feb. 1, 2019 (CN) .......................... 201910103475.6

(51) Int. Cl.
*H04W 28/08* (2009.01)
*H04W 28/12* (2009.01)

(52) U.S. Cl.
CPC ............ *H04W 28/08* (2013.01); *H04W 28/12* (2013.01)

(58) Field of Classification Search
None
See application file for complete search history.

(56) References Cited

U.S. PATENT DOCUMENTS

| 7,330,480 B2 | 2/2008 | Khan et al. | |
| 8,553,729 B2 * | 10/2013 | Zhang | H04W 88/16 370/503 |

(Continued)

FOREIGN PATENT DOCUMENTS

| CN | 205265864 U | * | 5/2016 |
| CN | 106972499 A | | 7/2017 |

(Continued)

OTHER PUBLICATIONS

International Search Report received from International application No. PCT/CN2019/077491 dated Nov. 1, 2019.

*Primary Examiner* — Ajit Patel
*Assistant Examiner* — Pamit Kaur
(74) *Attorney, Agent, or Firm* — Arent Fox LLP

(57) ABSTRACT

Provided is an accurate load shedding system and method based on a power-dedicated wireless network. The system includes: a control master station layer, a control substation layer and a terminal user access layer. The control master station layer includes a control master station apparatus and an optical/E1 conversion device. The control substation layer includes an optical/E1 conversion device, a control substation apparatus and a wireless access device. The terminal user access layer includes a wireless core network, a base station and a control terminal. The wireless access device is connected to the wireless core network through Ethernet. The wireless core network is connected with the base station through an optical fiber. The control terminal is connected to a wireless network of the base station through customer premise equipment (CPE).

8 Claims, 5 Drawing Sheets

(56) References Cited

U.S. PATENT DOCUMENTS

2006/0291455 A1* 12/2006 Katz ...................... H04L 67/14
370/355
2018/0032094 A1* 2/2018 Zhang .................. G05B 19/054
2018/0212706 A1* 7/2018 Ghuman ............. H04J 14/0291

FOREIGN PATENT DOCUMENTS

| CN | 107134787 A | 9/2017 |
| CN | 108565968 A | 9/2018 |

* cited by examiner

ACCURATE LOAD SHEDDING SYSTEM AND METHOD BASED ON A POWER-DEDICATED WIRELESS NETWORK

CROSS-REFERENCE TO RELATED APPLICATIONS

This application claims priority to a Chinese patent application No. 201910103475.6 filed on Feb. 1, 2019, the disclosure of which is incorporated herein by reference in its entirety.

TECHNICAL FIELD

Embodiments of the present disclosure relate to the technical field of power systems, and particularly relate to an accurate load shedding system and method based on a power-dedicated wireless network.

BACKGROUND

An accurate load shedding system can centralize interruptible loads of dispersed power users for accurate control at the level of millisecond, so as to implement flexible adjustment and achieve instantaneous equilibrium of power supply and demand. An accurate load shedding system may be generally divided into three layers, i.e., a control master station layer, a control substation layer and a terminal user access layer.

In an existing accurate load shedding system, the terminal user access layer user often uses a bare fiber to connect a control terminal to a large user access apparatus of a nearby substation, so as to realize the access of the control terminal. However, interruptible loads of power users have the characteristics of small load, dispersed geographical locations and large number of users. In scenarios such as large number of widely distributed user points, complex path and environment and lack of urban corridor resources, a large number of optical fibers shall be used in the method of connecting the control terminal to the large user access apparatus of the nearby substation of the user, leading to high investment cost, difficult coverage, and difficulty in later maintenance.

SUMMARY

The present disclosure provides an accurate load shedding system and method based on a power-dedicated wireless network, which enables a control terminal to be directly connected with a wireless access device through a power-dedicated wireless network, thereby saving investment cost of the system and reducing maintenance difficulty.

In a first aspect, embodiments of the present disclosure provide an accurate load shedding system based on a power-dedicated wireless network. The system includes a control master station layer, a control substation layer and a terminal user access layer.

The control master station layer includes a control master station apparatus and an optical/E1 conversion device. The control master station apparatus is connected with the optical/E1 conversion device of the control master station layer through an optical fiber.

The control substation layer includes an optical/E1 conversion device, a control substation apparatus and a wireless access device. The optical/E1 conversion device of the control master station layer is connected with the optical/E1 conversion device of the control substation layer through an SDH 2M line. The control substation apparatus is connected with the optical/E1 conversion device of the control substation layer through an optical fiber. The control substation apparatus is connected with the wireless access device through an optical fiber.

The terminal user access layer includes a wireless core network, a base station and a control terminal. The wireless access device is connected to the wireless core network through Ethernet. The wireless core network is connected with the base station through an optical fiber. The control terminal is connected to a wireless network of the base station through CPE.

In an embodiment, the control master station apparatus is installed on a 500 kV AC collecting station, and the control substation apparatus is installed on a 500 kV AC station and/or a 220 kV AC station.

In an embodiment, the wireless access device includes: an FPGA chip, two single-mode fiber interfaces and four indicator lights connected with the FPGA chip respectively, an Ethernet module connected with the FPGA chip, four Ethernet interfaces connected with the Ethernet module respectively, three RS-232 serial ports and an RS-485 serial port.

In an embodiment, the two single-mode fiber interfaces are configured to implement communication with the control substation apparatus based on a COMSTC protocol dedicated to control of stability.

The four indicator lights are respectively a power indicator light, an operation indicator light, an optical fiber communication indicator light and a network communication indicator light.

The four Ethernet interfaces are respectively ETH1, ETH2, ETH3 and ETH4. ETH1 and ETH2 are standby interfaces. ETH3 is configured to implement communication with the control terminal based on an IEC 60870-5-104 standard. ETH4 is used for project commissioning.

Any RS-232 serial port of the three RS-232 serial ports is configured to print commissioning information, and the remaining two RS-232 serial ports are standby RS-232 serial ports.

The RS-485 serial port is a standby RS-485 serial port and is configured to extend an IEC 60870-5-103 standard and/or a MODBUS application.

In an embodiment, the terminal user access layer further includes a security access gateway. The security access gateway is connected with the wireless access device and the wireless core network. The control terminal is provided with a security chip.

In a second aspect, embodiments of the present disclosure provide a load shedding method based on a power-dedicated wireless network. The method is applied to the accurate load shedding system based on a power-dedicated wireless network of any one embodiment of the first aspect in embodiments of the present disclosure and includes:

receiving, by the wireless access device, data sent by the control substation apparatus;

checking, by the wireless access device, the data and determining whether the data is abnormal;

if the data is normal, parsing, by the wireless access device, the data and determining a type of the data;

if the type of the data is a load shedding instruction, setting, by the wireless access device, a flag bit and sending the load shedding instruction to the control terminal, so that the control terminal implement load shedding according to the load shedding instruction; and sending, by the wireless access device, sheddable load information to the control substation apparatus.

In an embodiment, the method further includes:

if the data is abnormal, sending, by the wireless access device, data abnormal information to the control substation apparatus.

In an embodiment, the method further includes:

if the type of the data is a time updating instruction, conducting, by the wireless access device, time updating according to time updating information included in the time updating instruction; and sending, by the wireless access device, time updating complete information to the control substation apparatus.

In an embodiment, before the wireless access device sends the load shedding instruction to the control terminal, the method further includes:

determining, by the wireless access device, whether a connection with the control terminal is established; and if the wireless access device has not established the connection with the control terminal, establishing, by the wireless access device, a transmission control protocol (TCP) connection with the control terminal.

In an embodiment, before the wireless access device sends the sheddable load information to the control substation apparatus, the method further includes:

acquiring, by the wireless access device, the sheddable load information through the control terminal.

In a third aspect, embodiments of the present disclosure also provide a computer readable storage medium, storing a computer program, wherein the computer program, when executed by a processor, implements the load shedding method based on a power-dedicated wireless network described in any embodiment of the second aspect in embodiments of the present disclosure.

The accurate load shedding system based on a power-dedicated wireless network provided by the present disclosure includes a control master station layer, a control substation layer and a terminal user access layer. The control master station layer includes a control master station apparatus and an optical/E1 conversion device. The control master station apparatus is connected with the optical/E1 conversion device of the control master station layer through an optical fiber. The control substation layer includes an optical/E1 conversion device, a control substation apparatus and a wireless access device. The optical/E1 conversion device of the control master station layer is connected with the optical/E1 conversion device of the control substation layer through an SDH 2M line. The control substation apparatus is connected with the optical/E1 conversion device of the control substation layer through an optical fiber. The control substation apparatus is connected with the wireless access device through an optical fiber. The terminal user access layer includes a wireless core network, a base station and a control terminal. The wireless access device is connected to the wireless core network through Ethernet. The wireless core network is connected with the base station through an optical fiber. The control terminal is connected to a wireless network of the base station through CPE. Since the control terminal can be directly connected with the wireless access device through a power-dedicated wireless network composed of the wireless core network and the base station without connecting with a large user access apparatus of a nearby substation of a user through an optical fiber, investment cost of the system and maintenance difficulty of the system are reduced.

DETAILED DESCRIPTION

The present disclosure will be further described below in detail in combination with drawings and embodiments. It can be understood that specific embodiments described herein are only used for explaining the present disclosure, not used for limiting the present disclosure. In addition, it shall be indicated that for ease of description, drawings only show some structures related to the present disclosure rather than all structures.

It should be indicated that terms "system" and "network" in the present disclosure are often used interchangeably herein. The phrase "and/or" mentioned in embodiments of the present disclosure refers to any and all combinations including one or more related listed items. Terms, such as "the first" and "the second", in the description, claims and drawings of the present disclosure are used for distinguishing different objects, rather than defining a specific sequence.

It should also be indicated that the following embodiments of the present disclosure can be executed independently, or in combination with each other, which is not specifically limited in embodiments of the present disclosure.

Figure 1:
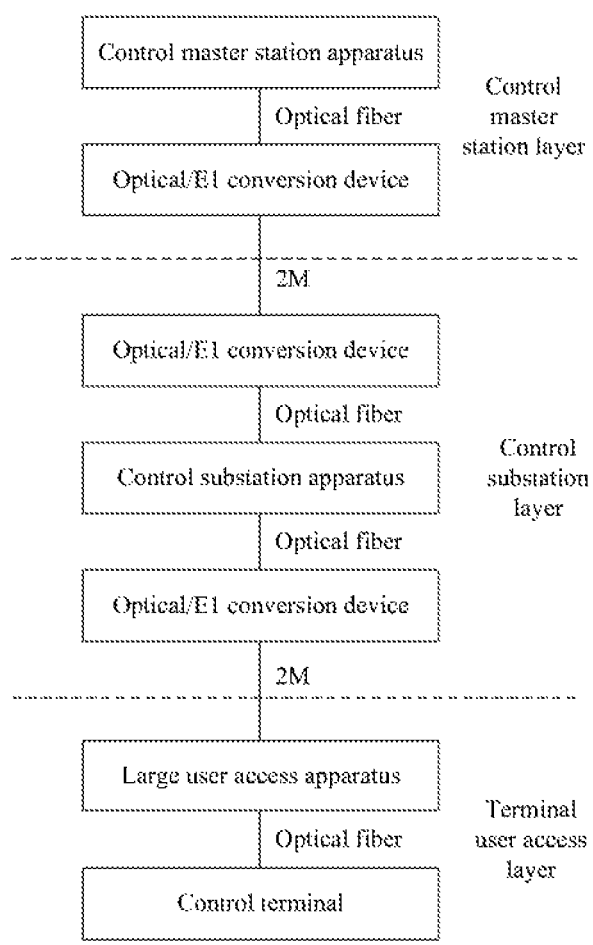
FIG. 1 is a structural schematic diagram illustrating an accurate load shedding system in the related art.

FIG. 1 is a structural schematic diagram illustrating an accurate load shedding system in the related art. As shown in FIG. 1, the accurate load shedding system includes a control master station layer, a control substation layer and a terminal user access layer. Different layers are connected through a synchronous digital hierarchy (SDH) 2M line. Since a control master station apparatus in the control master station layer and a control substation apparatus in the control substation layer often do not have the 2M interface, in order to implement connection through the SDH 2M line, each of the control master station apparatus and the control substation apparatus shall be provided with an optical/E1 conversion device. The control master station apparatus is connected with the optical/E1 conversion device through an optical fiber. The control substation apparatus is connected with the optical/E1 conversion device through an optical fiber. The optical/E1 conversion devices are connected with each other through the SDH 2M line. The terminal user access layer includes a large user access apparatus of a nearby station of a user and a control terminal. The control terminal is connected with the large user access apparatus through an optical fiber. However, interruptible loads of power users have the characteristics of small load, dispersed geographical locations and large number of users. In scenarios such as large number of widely distributed user points, complex path and environment and lack of urban corridor resources, a large number of optical fibers shall be used in the method of connecting the control terminal to the large user access apparatus of the nearby substation of the user, leading to high investment cost, difficult coverage, and difficulty in later maintenance.

Embodiments of the present disclosure provide an accurate load shedding system and method based on a power-dedicated wireless network, which enables the control terminal to be directly connected with a wireless access device through a power-dedicated wireless network, thereby reducing investment cost of the system and maintenance difficulty of the system.

The accurate load shedding system and method based on a power-dedicated wireless network and technical effects are described below in detail.

Figure 2:
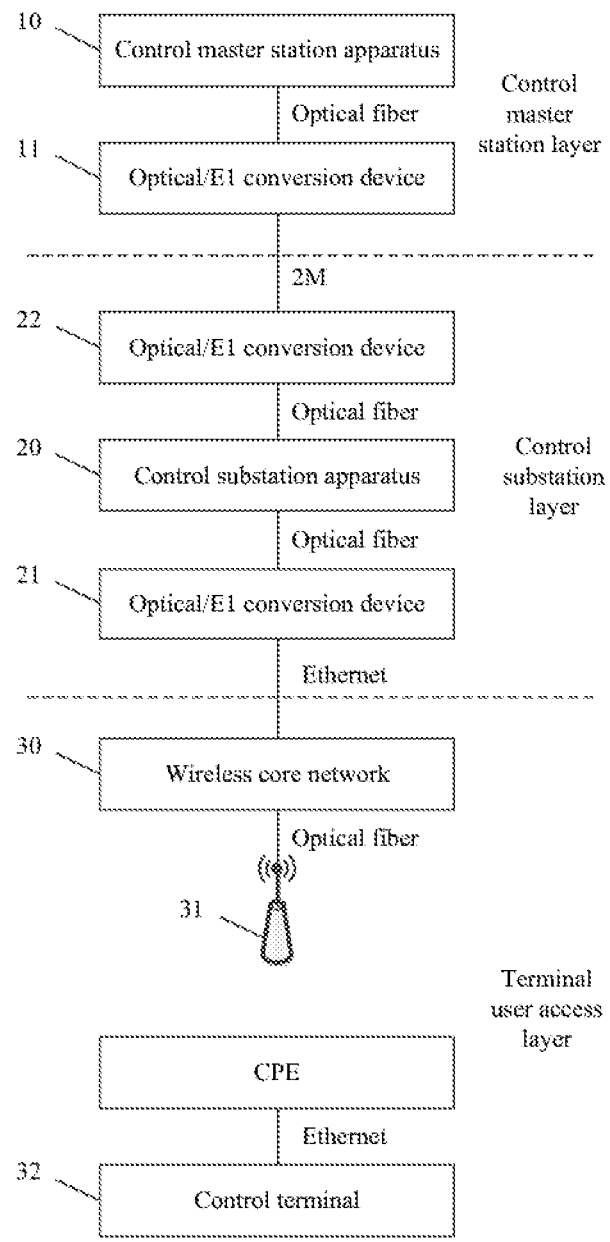
FIG. 2 is a structural schematic diagram illustrating an accurate load shedding system based on a power-dedicated wireless network provided by an embodiment of the present disclosure.

FIG. 2 is a structural schematic diagram illustrating an accurate load shedding system based on a power-dedicated wireless network provided by an embodiment of the present disclosure. The system includes a control master station layer, a control substation layer and a terminal user access layer.

The control master station layer includes a control master station apparatus 10 and an optical/E1 conversion device 11. The control master station apparatus 10 is connected with the optical/E1 conversion device 11 of the control master station layer through an optical fiber.

The control master station apparatus 10 is generally a 500 kV AC collecting station which is disposed at proximity of a DC drop-point converter station and has good channel conditions. The control master station apparatus 10 may receive a load shedding instruction sent by a superior stability control system, distribute loads and issue the load shedding instruction.

The control master station layer includes a control master station apparatus 20, a wireless access device 21 and an optical/E1 conversion device 22. The optical/E1 conversion device 11 of the control master station layer is connected with the optical/E1 conversion device 22 of the control substation layer through a synchronous digital hierarchy (SDH) 2M line. The control substation apparatus 20 is connected with the optical/E1 conversion device 22 of the control substation layer through an optical fiber. The optical/E1 conversion device 11 of the control master station layer and the optical/E1 conversion device 22 of the control substation layer implement SDH 2M line connection between the control master station apparatus 10 and the control substation apparatus 20. The control substation apparatus 20 is connected with the wireless access device 21 through an optical fiber. The control substation apparatus 20 and the wireless access device 21 may adopt a COMSTC protocol dedicated to control of stability.

The control substation apparatus 20 is generally a 500 kV AC station and/or a 220 kV AC station located in a load-concentrated area. The control substation apparatus 20 may collect sheddable load information of the load-concentrated area, send the sheddable load information to the control master station apparatus 10 and execute load shedding according to the load shedding instruction sent by the control master station apparatus 10.

The terminal user access layer includes a wireless core network 30, a base station 31 and a control terminal 32. The wireless access device 21 is connected to the wireless core network 30 through Ethernet. The wireless core network 30 is connected with the base station 31 through an optical fiber. The control terminal 32 is connected to a wireless network of the base station 31 through customer premise equipment (CPE). The control terminal 32 is connected with the CPE through the Ethernet. Each control terminal 32 may correspond to one CPE to implement mutual conversion between a wireless signal and a wired signal. The position of the base station 31 may be near the control terminal 32.

The wireless core network 30 and the base station 31 may jointly form a power-dedicated wireless network. The power-dedicated wireless network may be a newly established power-dedicated wireless network or an existing power-dedicated wireless network, which is not limited specifically by embodiments of the present disclosure.

The control terminal 32 is often arranged in a power distribution room of a user. The control terminal 32 may collect sheddable load information of the user, send the sheddable load information to the control substation apparatus 20 and also receive the load shedding instruction sent by the control substation apparatus 20, so as to rapidly shed an interruptible load.

The above accurate load shedding system based on a power-dedicated wireless network enables the control terminal 32 to be directly connected with the wireless access device 21 through the power-dedicated wireless network composed of the wireless core network 30 and the base station 31 without being connected with a large user access apparatus of a nearby substation of the user through an optical fiber, thereby reducing investment cost of the system and maintenance difficulty of the system.

Figure 3:
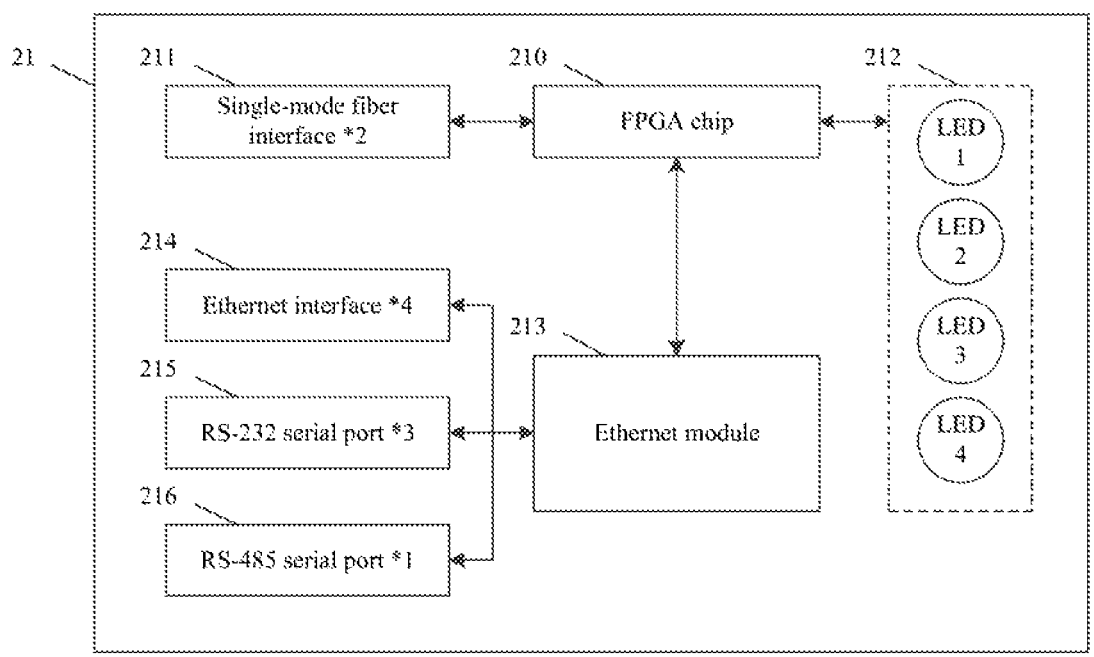
FIG. 3 is a structural schematic diagram illustrating a wireless access device provided by an embodiment of the present disclosure.

In an embodiment, FIG. 3 is a structural schematic diagram illustrating a wireless access device provided by an embodiment of the present disclosure. As shown in FIG. 3, the wireless access device 21 includes: a field programmable gate array (FPGA) chip 210; two single-mode fiber interfaces 211 and four indicator lights 212 connected with the FPGA chip 210 respectively; an Ethernet module 213 connected with the FPGA chip 210; four Ethernet interfaces 214 connected with the Ethernet module 213 respectively; three RS-232 serial ports 215; and one RS-485 serial port 216.

The two single-mode fiber interfaces 211 are configured to implement communication with the control substation apparatus 20 based on a COMSTC protocol dedicated to control of stability.

The four indicator lights 212 are respectively a power indicator light LED1, an operation indicator light LED2, an optical fiber communication indicator light LED3 and a network communication indicator light LED4. In an embodiment, the optical fiber communication indicator light LED3 and the network communication indicator light LED4 are red-green bicolor indicator lights.

The four Ethernet interfaces 214 are respectively ETH1, ETH2, ETH3 and ETH4. ETH1 and ETH2 are standby interfaces. ETH3 is configured to implement communication with the control terminal 32 based on an International Electrotechnical Commission (IEC) 60870-5-104 standard. ETH4 is used for project commissioning.

Any RS-232 serial port of the three RS-232 serial ports 215 is configured to print commissioning information, and the remaining two RS-232 serial ports are standby RS-232 serial ports.

The RS-485 serial port is a standby RS-485 serial port and is configured to extend an IEC 60870-5-103 standard and/or a MODBUS application. MODBUS is a serial communication protocol and is used for a serial port, Ethernet and other versions of networks that support Internet protocols.

The Ethernet module 213 may be select to be a PC104 data collecting card.

It should be noted that, the wireless access device 21 may adopt 1U chassis design, which is compact in structure, can save screen cabinet space to the greatest extent and can facilitate group screen design.

Figure 4:
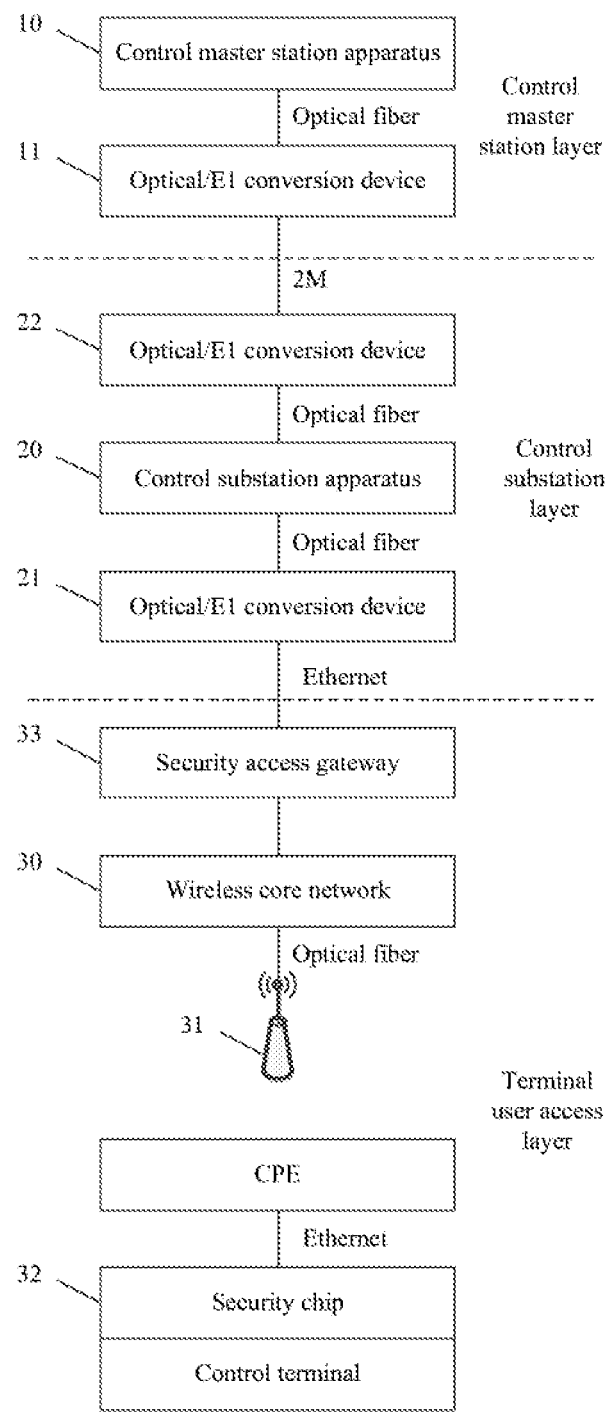
FIG. 4 is a structural schematic diagram illustrating another accurate load shedding system based on a power-dedicated wireless network provided by an embodiment of the present disclosure.

Based on the above embodiment, FIG. 4 is a structural schematic diagram illustrating another accurate load shedding system based on a power-dedicated wireless network provided by an embodiment of the present disclosure. The difference from FIG. 2 is that, the terminal user access layer further includes a security access gateway 33 which is connected with the wireless access device 21 and the wireless core network 30. The security access gateway 33 can encrypt/decrypt data transmitted between the wireless access device 21 and the control terminal 32, so as to meet the security requirements of the accurate load shedding system based on a power-dedicated wireless network.

Correspondingly, a security chip is arranged in the control terminal 32. The security chip is paired with the security access gateway 33 for use, so as to meet the security requirements of the accurate load shedding system based on a power-dedicated wireless network.

Embodiments of the present disclosure provide an accurate load shedding system based on a power-dedicated wireless network, including: a control master station layer, a control substation layer and a terminal user access layer. The control master station layer includes a control master station apparatus and an optical/E1 conversion device. The control master station apparatus is connected with the optical/E1 conversion device of the control master station layer through an optical fiber. The control substation layer includes an optical/E1 conversion device, a control substation apparatus and a wireless access device. The optical/E1 conversion device of the control master station layer is connected with the optical/E1 conversion device of the control substation layer through a SDH 2M line. The control substation apparatus is connected with the optical/E1 conversion device of the control substation layer through an optical fiber. The control substation apparatus is connected with the wireless access device through an optical fiber. The terminal user access layer includes a wireless core network, a base station and a control terminal. The wireless access device is connected to the wireless core network through Ethernet. The wireless core network is connected with the base station through an optical fiber. The control terminal is connected to a wireless network of the base station through CPE. Since the control terminal can be directly connected with the wireless access device through a power-dedicated wireless network composed of the wireless core network and the base station without being connected with a large user access apparatus of a nearby substation of a user through an optical fiber, investment cost of the system and maintenance difficulty of the system are reduced.

Figure 5:
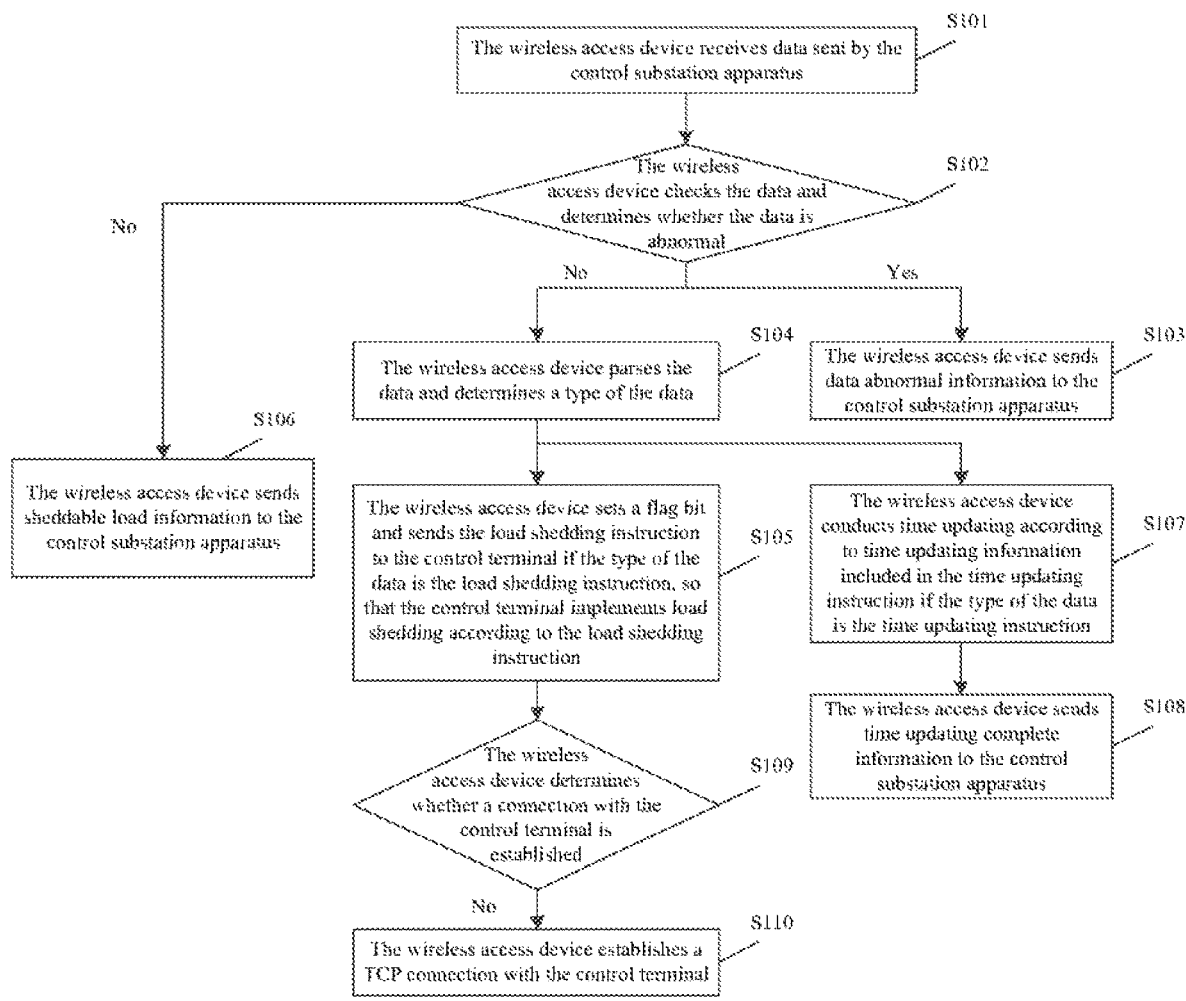
FIG. 5 is a flow chart illustrating a load shedding method based on a power-dedicated wireless network provided by an embodiment of the present disclosure.

FIG. 5 is a flow chart illustrating a load shedding method based on a power-dedicated wireless network provided by an embodiment of the present disclosure. The method is applied to the accurate load shedding system based on a power-dedicated wireless network in the above embodiment. As shown in FIG. 5, the method may include the steps described below.

In step S101, the wireless access device receives data sent by the control substation apparatus. Specifically, the wireless communication device and the control substation apparatus adopt a single-mode optical fiber communication manner. The communication protocol is a COMSTC protocol dedicated to control of stability, and data interaction is implemented once within 1.667 ms. The format of a COMSTC data frame is shown in Table 1.

TABLE 1

| No. | Definition | Size (byte) | Address |
|---|---|---|---|
| 1 | Total length of receiving/transmitting frame | 1024 | 0x000 - 0x3FF |
| 2 | COMSTC register area | 64 | 0x000 - 0x03F |
| 3 | Communication application data area | 960 | 0x040 - 0x3FF |
| 4 | Data length per channel | 12/16/32/40/64/80 | — |
| 5 | Number of communication channels per frame | 80/60/30/24/15/12 | — |

The COMSTC protocol dedicated to control of stability is a communication module which is designed based on FPGA intellectual property core (IP Core) by integrating a link layer, a transmission layer and a network layer and can be reused flexibly. The COMSTC module provides a standard memory external interface for central processing units (CPUs) of both sides of communication. Each COMSTC path contains a 2 k-byte transceiver data area and a 128-byte register area. Since the COMSTC integrates the contents of the communication link layer and the transmission layer, both sides of communication can achieve reliable high-speed communication only by reading and writing data to the memory area. The COMSTC simplifies a communication process of both sides into a virtual dual-port memory, which can greatly reduce the processing burden of the CPU and realize high-speed and highly reliable data transmission. A plurality of such modules may be integrated into one FPGA chip and may operate in parallel. Thus, the CPU can achieve one-to-multiple communication simply by accessing different memory segments. The COMSTC uses 32.768 Mbps line transmission rate, and data bandwidth of an effective application layer for both sides of communication may be 24 Mbps.

In step S102, the wireless access device checks the data and determines whether the data is abnormal.

The wireless access device checks the data mainly for the purpose of determining whether the frame format of the data is complete and correct.

In step S103, the wireless access device sends data abnormal information to the control substation apparatus if the data is abnormal.

In an embodiment, when the wireless access device determines that only one-frame data is abnormal, the wireless access device may discard the abnormal data; and when the wireless access device determines that continuous multi-frame data is abnormal, the wireless access device may send the data abnormal information to the control substation apparatus to inform the control substation apparatus of the abnormal data.

In step S104, the wireless access device parses the data and determines a type of the data if the data is normal.

Specifically, the type of the data may include a load shedding instruction and a time updating instruction.

In step S105, the wireless access device sets a flag bit and sends the load shedding instruction to the control terminal if the type of the data is the load shedding instruction, so that the control terminal implements load shedding according to the load shedding instruction.

When the wireless access device is connected with the control terminal, the wireless access device must send a load shedding instruction to the control terminal within 5 ms after receiving the load shedding instruction from the control substation, so that the control terminal implements the load shedding according to the load shedding instruction.

In an embodiment, the value of the flag bit of the data frame is set to 1 by the wireless access device.

In an embodiment, when the wireless access device determines that the value of the flag bit is 1, the load shedding instruction is sent to the control terminal; and when the wireless access device determines that the value of the flag is not 1, no operation is executed.

In an embodiment, the step in which the wireless access device determines that the value of the flag is 1 may include: when the wireless access device determines that the values of the flag bits of three continuous data frames are 1, the load shedding instruction is sent to the control terminal, so as to ensure the data security.

The packet frame of the load shedding instruction adopts an extended 104 protocol, which adopts a type flag 0×B1 and a information object address 0xC001. The format of the packet frame of the load shedding instruction sent by the wireless access device to the control terminal is shown in Table 2.

TABLE 2

| No. | Field Name | Field Content | Remarks |
| --- | --- | --- | --- |
| 1 | Starter | 68 | — |
| 2 | Length | 0E | — |
| 3 | Transmitting serial number | XX XX | Transmitting serial number of Two Bytes |
| 4 | Receiving serial number | XX XX | Receiving serial number of Two Bytes |
| 5 | Type Flag | B1 | Direct Control |
| 6 | Variable Structure Qualifier | 01 | — |
| 7 | Transmitting Reason | 06 00 | — |
| 8 | Public Address | 01 00 | — |
| 9 | Information Object Address | 01 C0 00 | — |
| 10 | Information Object | 01 | — |

Correspondingly, the control terminal may also send data information such as load shedding feedback to the wireless access device. The frame format of the information sent by the control terminal to the wireless access device is shown in Table 3.

TABLE 3

| No. | Field Name | Field Content | Remarks |
| --- | --- | --- | --- |
| 1 | Starter | 68 | — |
| 2 | Length | 0E | — |
| 3 | Transmitting serial number | XX XX | Transmitting serial number of Two Bytes |
| 4 | Receiving serial number | XX XX | Receiving serial number of Two Bytes |
| 5 | Type Flag | B1 | Direct Control |
| 6 | Variable Structure Qualifier | 01 | — |
| 7 | Transmitting Reason | 07 00 | Positive Acknowledgement |
| 8 | Public Address | 47 00 | Negative Acknowledgement |
| 9 | Public Address | 01 00 | — |
| 10 | Information Object Address | 01 C0 00 | — |

It should be noted that, the field contents in Table 2 and Table 3 are hexadecimal numbers.

In step S106, the wireless access device sends sheddable load information to the control substation apparatus.

Specifically, the wireless access device may acquire the sheddable load information through the control terminal before the wireless access device sends the sheddable load information to the control substation apparatus. In addition, the wireless access device may also acquire the abnormal information, a strap state and other information of the control terminal through the control terminal, and send the information to the control substation apparatus.

In step S107, the wireless access device conducts time updating according to time updating information included in the time updating instruction if the type of the data is the time updating instruction.

The wireless access device performs time updating according to the time updating information to synchronize the time of the wireless access device and the control substation apparatus.

In step S108, the wireless access device sends time updating complete information to the control substation apparatus.

In addition, as shown in FIG. 5, the wireless access device may also determine whether a connection with the control terminal is established, including steps described below.

In step S109, the wireless access device determines whether a connection with the control terminal is established.

The wireless access device communicates with the control terminal through the IEC 60870-5-104 standard, and determines whether the wireless access device is connected with the control terminal every 200 ms. Specific definitions and standards shall conform to the requirements of DL/T 634.5104-2009.

In step S110, the wireless access device establishes a transmission control protocol (TCP) connection with the control terminal if the wireless access device has not established the connection with the control terminal.

If the wireless access device establishes the connection with the control terminal, the wireless access device may communicate with the control terminal.

In an embodiment, the wireless access device may also communicate in accordance with IEC 60870-5-104 standard to conduct timeout processing of T0, T1, T2 and T3 on the connection, and may conduct the processing of data summon timeout, so as to ensure the connection between the wireless access device and the control terminal.

The wireless access device may support the access of 64 control terminals at most. The process of instruction issuing is simple, thereby ensuring that all the control terminals can receive the instructions within 5 ms.

Embodiments of the present disclosure provide a load shedding method based on a power-dedicated wireless network. In the method, the wireless access device receives data sent by the control substation apparatus; the wireless access device checks the data and determines whether the data is abnormal; the wireless access device parses the data and determines a type of the data if the data is normal; the wireless access device sets a flag bit and sends a load shedding instruction to the control terminal if the type of the data is the load shedding instruction, so that the control terminal implements load shedding according to the load shedding instruction; and the wireless access device sends sheddable load information to the control substation apparatus. Load shedding can be implemented under the condition that the control terminal is directly connected with the wireless access device through the power-dedicated wireless network composed of the wireless core network and the base station.

Embodiments of the present disclosure further provide a computer readable storage medium which stores a computer program. The program, when executed by a processor, implements the load shedding method based on a power-dedicated wireless network described by above embodiments.

The computer storage medium of embodiments of the present disclosure may use any combination of one or more computer readable media. The computer readable medium may be a computer readable signal medium or a computer readable storage medium. The computer readable storage medium, for example, may be, but not limited to, a system, an apparatus or a device of electricity, magnetism, light, electromagnetism, infrared ray or semiconductor, or any combination thereof. More specific examples (non-exhaustive list) of the computer readable storage medium include: an electric connection of one or more wires, a portable computer hard disk, a hard disk, a random access memory (RAM), a read-only memory (ROM), an erasable programmable read-only memory (EPROM or a flash memory), an optical fiber, a portable compact disk read-only memory (CD-ROM), a light storage device, a magnetic storage device, or any proper combination thereof. Herein, the computer readable storage medium may be any tangible medium including or storing a program, and the program may be used by an instruction execution system, an apparatus or a device or used in a combination thereof.

The computer readable signal medium may be included in a baseband or be a data signal which is spread as a part of carrier, and carries a computer readable program code. Such spread data signal may adopt a plurality of forms, including but not limited to an electromagnetic signal, a light signal or any proper combination thereof. The computer readable signal medium may also be any computer readable medium other than the computer readable storage medium, and the computer readable medium may send, spread or transmit a program used by the instruction execution system, the apparatus or the device or in the combination thereof.

The program code included on the computer readable medium may be transmitted with any proper medium, including but not limited to wireless transmission, wire transmission, optical cable transmission, RF transmission, or any proper combination thereof.

The computer program code for executing the operation of the present disclosure may be written with one or more program design languages or a combination thereof. The program design language includes object-oriented program design languages, such as Java, Smalltalk and C++, and also includes conventional procedural program design languages, such as "C" language or similar program design languages. The program code may be completely executed on a user computer, partially executed on the user computer, executed as an independent software package, executed partially on the user computer or partially on a remote computer, or completely executed on the remote computer or a server. In case of the remote computer, the remote computer may be connected to the user computer through any kind of network, including a local area network (LAN) or a wide area network (WAN), or may be connected to an external computer (such as being connected through an Internet by means of an Internet service provider).

It should be noted that, the above only describes preferred embodiments of the present disclosure and applied technical principles. Those skilled in the art shall understand that the present disclosure is not limited to specific embodiments described herein. For those skilled in the art, various apparent variations, readjustments and replacements can be made without departing from a protection scope of the present disclosure. Therefore, although the present disclosure is described in detail through the above embodiments, the present disclosure is not limited to the above embodiments and may further include more other equivalent embodiments without departing from the concept of the present disclosure, while the scope of the present disclosure is decided by a scope of attached claims.

What is claimed is:

1. An accurate load shedding system based on a power-dedicated wireless network, comprising:
    a control master station layer, which comprises a control master station apparatus and an optical/E1 conversion device, wherein the control master station apparatus is connected with the optical/E1 conversion device of the control master station layer through an optical fiber;
    a control substation layer, which comprises an optical/E1 conversion device, a control substation apparatus and a wireless access device, wherein the optical/E1 conversion device of the control master station layer is connected with the optical/E1 conversion device of the control substation layer through a synchronous digital hierarchy (SDH) 2M line; the control substation apparatus is connected with the optical/E1 conversion device of the control substation layer through an optical fiber; and the control substation apparatus is connected with the wireless access device through an optical fiber;
    a terminal user access layer, which comprises a wireless core network, a base station and a control terminal, wherein the wireless access device is connected to the wireless core network through Ethernet; the wireless core network is connected with the base station through an optical fiber; and the control terminal is connected to a wireless network of the base station through customer premise equipment (CPE);
    wherein the wireless access device comprises: a field programmable gate array (FPGA) chip; two single-mode fiber interfaces and four indicator lights connected with the FPGA chip respectively; an Ethernet module connected with the FPGA chip; four Ethernet interfaces connected with the Ethernet module respectively; three RS-232 serial ports; and an RS-485 serial port;
    wherein
    the two single-mode fiber interfaces are configured to implement communication with the control substation apparatus based on a COMSTC protocol dedicated to control of stability;
    the four indicator lights comprises a power indicator light, an operation indicator light, an optical fiber communication indicator light and a network communication indicator light;
    the four Ethernet interfaces comprises ETH1, ETH2, ETH3 and ETH4, wherein the ETH1 and the ETH2 are standby interfaces; the ETH3 is configured to implement communication with the control terminal based on an IEC 60870-5-104 protocol; and the ETH4 is used for project commissioning;
    one RS-232 serial port of the three RS-232 serial ports is configured to print commissioning information, and remaining two RS-232 serial ports are standby RS-232 serial ports;
    the RS-485 serial port is a standby RS-485 serial port and is configured to extend at least one of an IEC 60870-5-103 protocol and/or a MODBUS application.

2. The system according to claim 1, wherein the control master station apparatus is installed on a 500 kV AC collecting station, and the control substation apparatus is installed on at least one of a 500 kV AC station or a 220 kV AC station.

3. The system according to claim 1, wherein the terminal user access layer further comprises a security access gateway, wherein the security access gateway is connected with the wireless access device and the wireless core network; wherein the control terminal is provided with a security chip.

4. A load shedding method based on a power-dedicated wireless network, applied to the accurate load shedding system based on a power-dedicated wireless network of claim 1, wherein the method comprises:
   receiving, by the wireless access device, data sent by the control substation apparatus;
   checking, by the wireless access device, the data and determining whether the data is abnormal;
   in response to determining that the data is normal, parsing, by the wireless access device, the data and determining a type of the data;
   in response to determining that the type of the data is a load shedding instruction, setting, by the wireless access device, a flag bit and sending the load shedding instruction to the control terminal, to enable the control terminal to implement load shedding according to the load shedding instruction; and
   sending, by the wireless access device, sheddable load information to the control substation apparatus.

5. The method according to claim 4, further comprising:
   in response to determining that the data is abnormal, sending, by the wireless access device, data abnormal information to the control substation apparatus.

6. The method according to claim 4, further comprising:
   in response to determining that the type of the data is a time updating instruction, conducting, by the wireless access device, time updating according to time updating information in the time updating instruction; and
   sending, by the wireless access device, time updating complete information to the control substation apparatus.

7. The method according to claim 4, wherein before sending, by the wireless access device, the load shedding instruction to the control terminal, the method further comprises:
   determining, by the wireless access device, whether a connection with the control terminal is established; and
   in response to determining that the wireless access device has not established the connection with the control terminal, establishing, by the wireless access device, a transmission control protocol (TCP) connection with the control terminal.

8. The method according to claim 4, wherein before sending, by the wireless access device, the sheddable load information to the control substation apparatus, the method further comprises:
   acquiring, by the wireless access device, the sheddable load information through the control terminal.

* * * * *